(12) United States Patent
Cho (10) Patent No.: US 9,347,531 B2
(45) Date of Patent: May 24, 2016

(54) BELT-TYPE CONTINUOUSLY VARIABLE TRANSMISSION

(76) Inventor: Yoon kyu Cho, Gyeongsangnam-do (KR)

( * ) Notice: Subject to any disclaimer, the term of this patent is extended or adjusted under 35 U.S.C. 154(b) by 813 days.

(21) Appl. No.: 13/263,425

(22) PCT Filed: Mar. 19, 2010

(86) PCT No.: PCT/KR2010/001715
§ 371 (c)(1),
(2), (4) Date: Oct. 7, 2011

(87) PCT Pub. No.: WO2010/117146
PCT Pub. Date: Oct. 14, 2010

(65) Prior Publication Data
US 2012/0040788 A1    Feb. 16, 2012

(30) Foreign Application Priority Data

Apr. 7, 2009  (KR) .......................... 10-2009-0029814

(51) Int. Cl.
*F16H 9/12*   (2006.01)
*F16H 9/24*   (2006.01)
(Continued)

(52) U.S. Cl.
CPC .................. *F16H 9/24* (2013.01); *F16H 55/54* (2013.01); *F16H 63/065* (2013.01)

(58) Field of Classification Search
CPC .......... F66H 55/54; F66H 63/065; F66H 9/24
USPC ..................................... 474/47, 49, 50, 56, 57
See application file for complete search history.

(56) References Cited

U.S. PATENT DOCUMENTS

| 4,295,836 A | 10/1981 | Kumm |
| 4,342,559 A * | 8/1982 | Williams ........................ 474/50 |
| 4,493,678 A * | 1/1985 | Husted ........................... 474/164 |

(Continued)

FOREIGN PATENT DOCUMENTS

| CN | 101435493 A  * | 5/2009 | |
| JP |   59026653 A  * | 2/1984 | ................ F16H 9/10 |

(Continued)

OTHER PUBLICATIONS

Machine Translation of CN 101435493 A.*

(Continued)

*Primary Examiner* — William E Dondero
*Assistant Examiner* — Diem Tran
(74) *Attorney, Agent, or Firm* — Novick, Kim & Lee, PLLC; Jae Youn Kim (57) ABSTRACT

A belt type CVT, which has a variable drive pulley controlling a transmission gear ratio by varying a diameter and a variable driven pulley connected to the variable drive pulley by a belt and controlling a tension of the belt by varying a diameter in a manner opposite to that of the variable drive pulley, in which each of the variable drive and driven pulleys includes belt supports movably installed between a pair of pulley plates, and transmission plates mounted to outside surfaces of respective pulley plates and rotated in opposite directions, thereby moving the plurality of belt supports in the radial directions, and the inner surface of the belt is provided with ratchet gear parts engaged with the belt holding ratchet gear parts of the belt supports, so that the diameters of the variable drive pulley and the variable driven pulley can be more easily and efficiently varied.

3 Claims, 8 Drawing Sheets

(51) Int. Cl.
*F16H 55/54* (2006.01)
*F16H 63/06* (2006.01)

(56) References Cited

U.S. PATENT DOCUMENTS

| | | | |
|---|---|---|---|
| 4,591,351 A | | 5/1986 | Kumm |
| 4,714,452 A | | 12/1987 | Kumm et al. |
| 2004/0220012 A1 | * | 11/2004 | Siman-tov .................... 475/207 |
| 2005/0227797 A1 | * | 10/2005 | Jeng ............................... 474/47 |
| 2012/0237379 A1 | * | 9/2012 | Glynn et al. ....................... 418/1 |

FOREIGN PATENT DOCUMENTS

| | | | | |
|---|---|---|---|---|
| KR | 20-2007-0000869 | | 8/2007 | |
| WO | WO 87-07693 A1 | | 12/1987 | |
| WO | WO 8809887 A1 | * | 12/1988 | ............... F16H 9/10 |
| WO | WO 02081949 A1 | * | 10/2002 | |
| WO | WO 2005036028 A1 | * | 4/2005 | ............... F16H 9/24 |

OTHER PUBLICATIONS

English Translation of Abstract of KR 20-2007-0000869.

* cited by examiner

PRIOR ART

BELT-TYPE CONTINUOUSLY VARIABLE TRANSMISSION

TECHNICAL FIELD

The present invention relates, in general, to a belt-type continuously variable transmission and, more particularly, to a belt-type continuously variable transmission, which includes a variable drive pulley controlling a transmission gear ratio by varying a diameter of the variable drive pulley and a variable driven pulley connected to the variable drive pulley by a belt and controlling a tension of the belt by varying a diameter of the variable drive pulley in a manner opposite that of the variable drive pulley, in which each of the variable drive pulley and the variable driven pulley includes a plurality of belt supports having belt holding ratchet gear parts and movably installed between a pair of pulley plates mounted to a pulley shaft such that the belt supports can be moved in radial directions, and transmission plates mounted to outside surfaces of the respective pulley plates and rotated in opposite directions by a transmission plate rotating device, thereby moving the plurality of belt supports in radial directions, and the belt is provided on an inner surface thereof with ratchet gear parts engaged with the belt holding ratchet gear parts formed on the belt supports of the variable drive pulley and the variable driven pulley in such a way that the ratchet gear parts engaged with the belt supports of the variable drive pulley and the ratchet gear parts engaged with the belt supports of the variable driven pulley are alternately arranged, so that the diameters of the variable drive pulley and the variable driven pulley can be more easily and efficiently varied, thereby realizing precise and efficient stepless variable transmission, and even when an excessive load is imposed on the belt and pulleys, the belt can be prevented from slipping over the pulleys and, accordingly, can realize more efficient power transmission.

BACKGROUND ART

Generally, a continuously variable transmission (CVT) is a device that continuously varies the transmission gear ratio between a maximum transmission gear ratio and a minimum transmission gear ratio according to a preset gear shaft pattern and, accordingly, allows a machine to efficiently use the engine output power, thereby realizing excellent power transmission performance and a mileage increase.

The CVTs are generally and widely used in a variety of industrial fields, such as automobiles, industrial machines, hoists, conveyors for goods transfer, winches, elevators and escalators. However, most of the conventional CVTs have a complicated construction so that they are easily disabled when being used. Further, although it is known that most conventional CVTs can steplessly or continuously vary the transmission gear ratio, the conventional CVTs practically, discontinuously varies the transmission gear ratio on an operational construction basis thereof, so that the range of varying the transmission gear ratio is limited and, accordingly, the conventional CVTs may not be efficiently adapted to a variety of uses.

Figure 1:
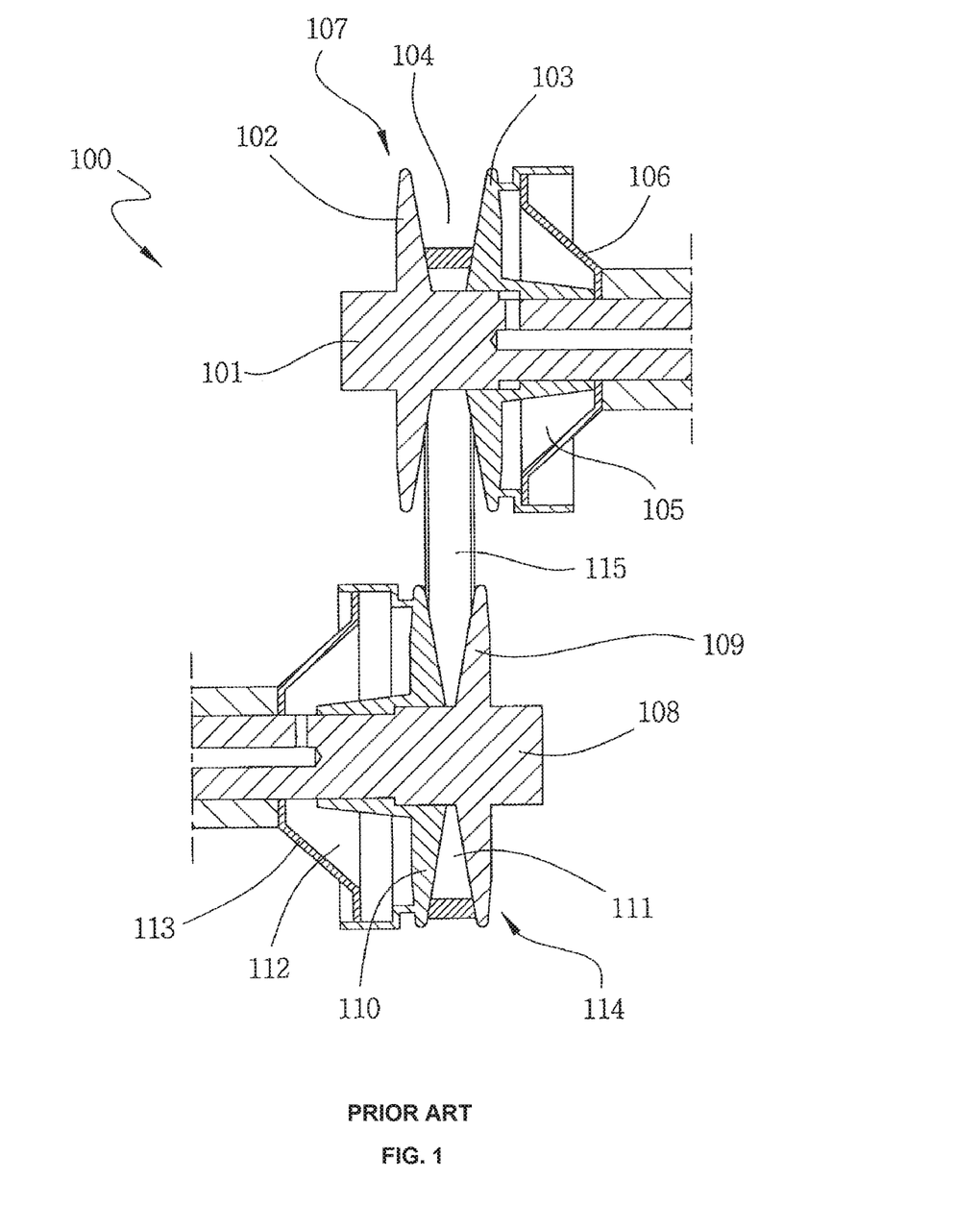
FIG. 1 is a view illustrating a conventional V-belt type CVT.

In the related art, a V-belt type CVT 100 shown in FIG. 1 has been widely used as a CVT. The V-belt type CVT 100 includes a variable drive pulley 107, a variable driven pulley 114 and a V-belt 115. The variable drive pulley 107 has a drive-side fixed pulley plate 102 fixed to an outer circumferential surface of a drive shaft 101 receiving the output power of an engine, a drive-side movable pulley plate 103 movably mounted to the outer circumferential surface of the drive shaft 101 so that the movable pulley plate 103 can move in an axial direction and forms a drive-side V-groove 104 in conjunction with the drive-side fixed pulley plate 102, and a drive-side hydraulic cylinder 106 forming a hydraulic chamber 105 on a rear surface of the drive-side movable pulley plate 103. The variable driven pulley 114 has a driven-side fixed pulley plate 109, which is fixed to an outer circumferential surface of a driven shaft 108 arranged at a predetermined location spaced apart from the drive shaft 101 so that the driven shaft 108 is parallel to the drive shaft 101, a driven-side movable pulley plate 110 movably mounted to the outer circumferential surface of the driven shaft 108 so that the movable pulley plate 110 can move in an axial direction and forms a driven-side V-groove 111 in conjunction with the driven-side fixed pulley plate 109, and a driven-side hydraulic cylinder 113 forming a hydraulic chamber 112 on a rear surface of the driven-side movable pulley plate 110. The V-belt 115 is connected between the variable drive pulley 107 and the variable driven pulley 114 by wrapping both around the drive-side V-groove 104 of the drive pulley 107 and around the driven-side V-groove 111 of the driven pulley 114.

The conventional V-belt type CVT having the above-mentioned construction is configured to realize a desired transmission gear ratio by varying the radiuses of contact between the V-belt 115 and the variable drive pulley 107 and the variable driven pulley 114. Here, the variation in the radiuses of contact between the V-belt 115 and the pulleys 107 and 114 may be realized by applying a predetermined hydraulic pressure to the hydraulic chamber 105 of the drive-side hydraulic cylinder 106 through a hydraulic line formed in the drive shaft 101 so that the drive-side movable pulley plate 103 is moved in an axial direction to reduce the width of the drive-side V-groove 104 of the variable drive pulley 107 and, at the same time, by applying a predetermined hydraulic pressure to the hydraulic chamber 112 of the driven-side hydraulic cylinder 113 through a hydraulic line formed in the driven shaft 108 so that the driven-side movable pulley plate 110 is moved in an axial direction to enlarge the width of the driven-side V-groove 111 of the variable driven pulley 114. Alternatively, the variation in the radiuses of contact between the V-belt 115 and the pulleys 107 and 114 may be realized by enlarging the width of the drive-side V-groove 104 of the variable drive pulley 107 and, at the same time, by reducing the width of the driven-side V-groove 111 of the variable driven pulley 114.

However, the above-mentioned conventional V-belt type CVT is problematic in that the V-belt 115 is in frictional contact both with the variable drive pulley 107 and with the variable driven pulley 114, so that when an excessive load is imposed on the belt and pulleys, the V-belt 115 may slip over the variable drive pulley 107 and over the variable driven pulley 114 and, accordingly, the V-belt may fail to efficiently transmit the engine power and the durability of the V-belt 115 may be remarkably reduced by the slip. Further, the tension of the V-belt 115 may be easily reduced by the repeated use of the CVT, so that the V-belt may not perform power transmission as desired.

DISCLOSURE

Technical Problem

Accordingly, the present invention has been made keeping in mind the above problems occurring in the related art, and is intended to provide a belt-type CVT, which includes a variable drive pulley controlling a transmission gear ratio by varying a diameter thereof and a variable driven pulley connected to the variable drive pulley by a belt and controlling a tension of the belt by varying a diameter thereof in a manner opposite that of the variable drive pulley, in which each of the variable drive pulley and the variable driven pulley includes a plurality of belt supports having belt holding ratchet gear parts and movably installed between a pair of pulley plates mounted to a pulley shaft such that the belt supports can be moved in radial directions, and transmission plates mounted to outside surfaces of the respective pulley plates and rotated in opposite directions by a transmission plate rotating device, thereby moving the plurality of belt supports in radial directions, and the belt is provided on an inner surface thereof with ratchet gear parts engaged with the belt holding ratchet gear parts formed on the belt supports of the variable drive pulley and the variable driven pulley in such a way that the ratchet gear parts engaged with the belt supports of the variable drive pulley and the ratchet gear parts engaged with the belt supports of the variable driven pulley are alternately arranged, so that the diameters of the variable drive pulley and the variable driven pulley can be more easily and efficiently varied, thereby realizing precise and efficient stepless variable transmission, and even when an excessive load is imposed on the belt and pulleys, the belt can be prevented from slipping over the pulleys and, accordingly, can realize more efficient power transmission.

Technical Solution

In an aspect, the present invention provides a belt-type continuously variable transmission, including: a variable drive pulley controlling a transmission gear ratio by varying a diameter thereof, and a variable driven pulley connected to the variable drive pulley by a belt and controlling a tension of the belt by varying a diameter thereof in a manner opposite that of the variable drive pulley, wherein the variable drive pulley includes: a pulley shaft having a pulley plate holder on a central portion of an outer circumferential surface thereof; a pair of pulley plates mounted to opposite ends of the pulley plate holder of the pulley shaft, each of the pulley plates having a pulley shaft hole formed through a center thereof and a plurality of slide slits radially formed therein at locations outside the pulley shaft hole; a plurality of belt supports movably installed between the pair of pulley plates such that the belt supports can move relative to the pulley plates in radial directions, each of the belt supports having a belt holding ratchet gear part formed on an outer surface thereof, a slide part formed on each end thereof and inserted into an associated slide slit of the pulley plates, and a guide protrusion protruding outside an outer surface of an associated one of the pulley plates; a pair of transmission plates rotatably mounted to the outer surfaces of respective pulley plates mounted to the opposite ends of the pulley plate holder of the pulley shaft, with a thrust bearing interposed between each of the transmission plates and an associated pulley plate, each of the transmission plates having a pulley shaft hole formed through a center thereof and a plurality of involute slits radially formed therein at locations outside the pulley shaft hole such that the involute slits of the transmission plates receive respective guide protrusions of the plurality of belt supports installed between the pulley plate; and a transmission plate rotating device rotating the transmission plates, which are rotatably mounted to the outer surfaces of the respective pulley plates, in opposite directions, thereby moving the plurality of belt supports installed between the pulley plates in radial directions; the variable driven pulley has the same construction as that of the variable drive pulley, wherein the belt holding ratchet gear parts formed on the outer surfaces of the belt supports of the variable driven pulley are inclined in a direction opposed to that of the belt holding ratchet gear parts formed on the belt supports of the variable drive pulley; and the belt is provided on an inner surface thereof both with drive-side ratchet gear parts engaged with the belt holding ratchet gear parts formed on the belt supports of the variable drive pulley and with driven-side ratchet gear parts engaged with the belt holding ratchet gear parts formed on the belt supports of the variable driven pulley, wherein the drive-side ratchet gear parts and the driven-side ratchet gear parts are alternately arranged.

Further, in the present invention, the transmission plate rotating device may include: a pair of hydraulic actuators mounted to central portions of outer surfaces of respective transmission plates, each of the hydraulic actuators including: a housing having a through hole formed through each of the front and rear walls thereof so that the pulley shaft passes through the housing, with an oil chamber defined in the housing; partitions oppositely installed in the housing in such a way that the partitions partition the oil chamber into two spaces; a rotor fitted over the outer circumferential surface of the pulley shaft, which passes through the housing, at a location inside the oil chamber partitioned by the partitions into the two spaces, so that the rotor rotates along with the pulley shaft; vanes oppositely protruding from the outer circumferential surface of the rotor in such a way that the vanes divide the oil chamber partitioned into two spaces by the partitions into four spaces; an oil passage formed in the pulley shaft such that the oil passage communicates with a plurality of oil inlet/outlet holes formed in the rotors inserted into the housings of the hydraulic actuators, so that the oil passage applies hydraulic pressure to the hydraulic actuators mounted to the respective transmission plates; and an oil inlet/outlet block rotatably fitted over an end of the outer circumferential surface of the pulley shaft in such a way that the oil inlet/outlet block communicates with the oil passage formed in the pulley shaft.

Advantageous Effects

As described above, the belt-type CVT according to the present invention is configured such that the variable drive pulley can control the transmission gear ratio by varying the diameter thereof and the variable driven pulley connected to the variable drive pulley by the belt can control the tension of the belt by varying the diameter thereof in the manner opposite that of the variable drive pulley, in which each of the variable drive pulley and the variable driven pulley includes the plurality of belt supports having the belt holding ratchet gear parts and movably installed between the pair of pulley plates mounted to the pulley shaft such that the belt supports can be moved in radial directions, and the transmission plates mounted to the outside surfaces of the respective pulley plates and rotated in opposite directions by the transmission plate rotating device, thereby moving the plurality of belt supports in the radial directions, and the belt is provided on the inner surface thereof with ratchet gear parts engaged with the belt holding ratchet gear parts formed on the belt supports of the variable drive pulley and the variable driven pulley in such a way that the ratchet gear parts engaged with the belt supports of the variable drive pulley and the ratchet gear parts engaged with the belt supports of the variable driven pulley are alternately arranged, so that the diameters of the variable drive pulley and the variable driven pulley can be more easily and efficiently varied, thereby realizing precise and efficient stepless variable transmission, and even when an excessive load is imposed on the belt and pulleys, the belt can be prevented from slipping over the pulleys and, accordingly, can realize more efficient power transmission.

MODE FOR INVENTION

Hereinbelow, the present invention realizing the above-mentioned object will be described in detail with reference to the accompanying drawings, FIGS. 2 through 8.

Figure 2:
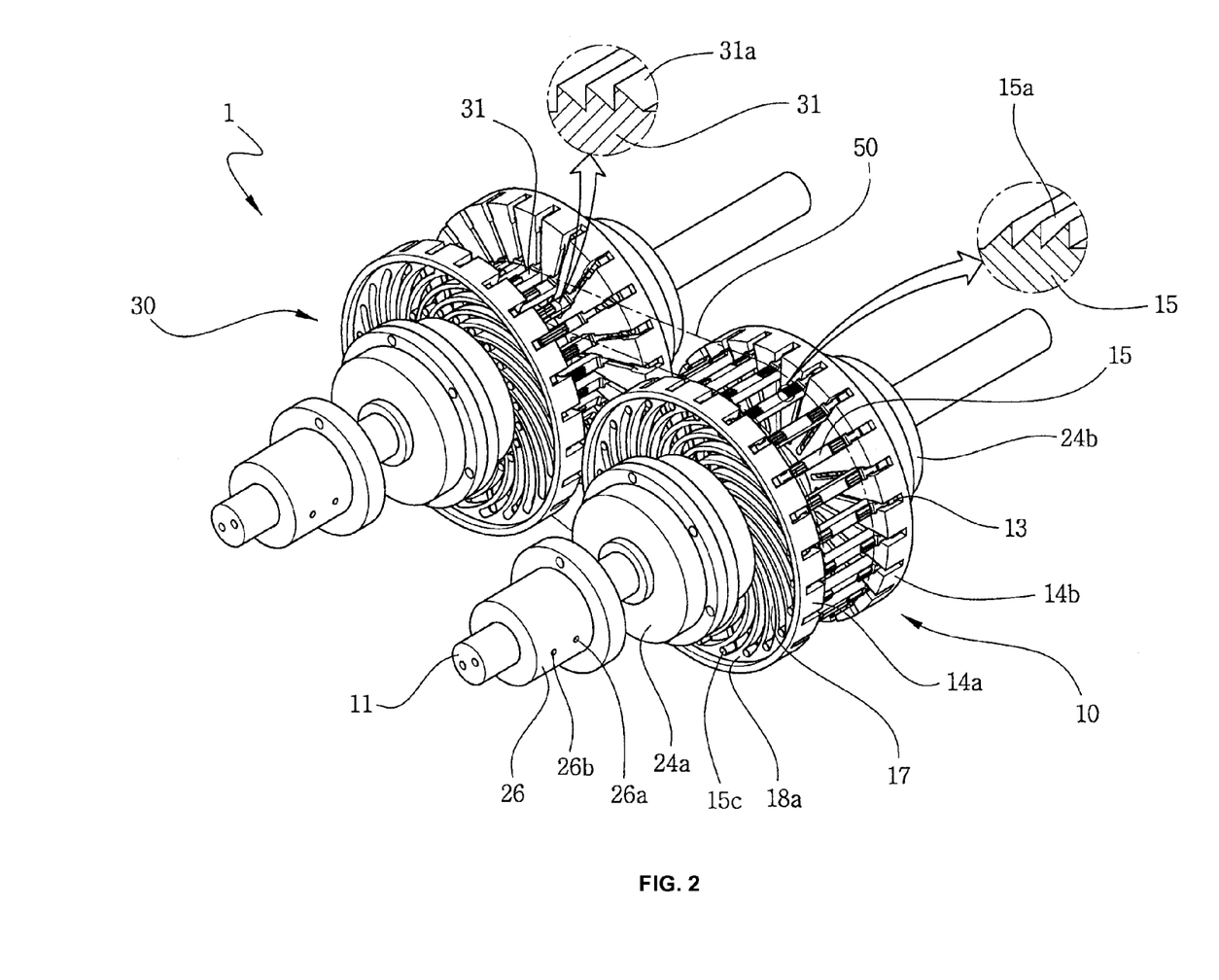
FIG. 2 is a perspective view illustrating a belt-type CVT according to the present invention.
Figure 3:
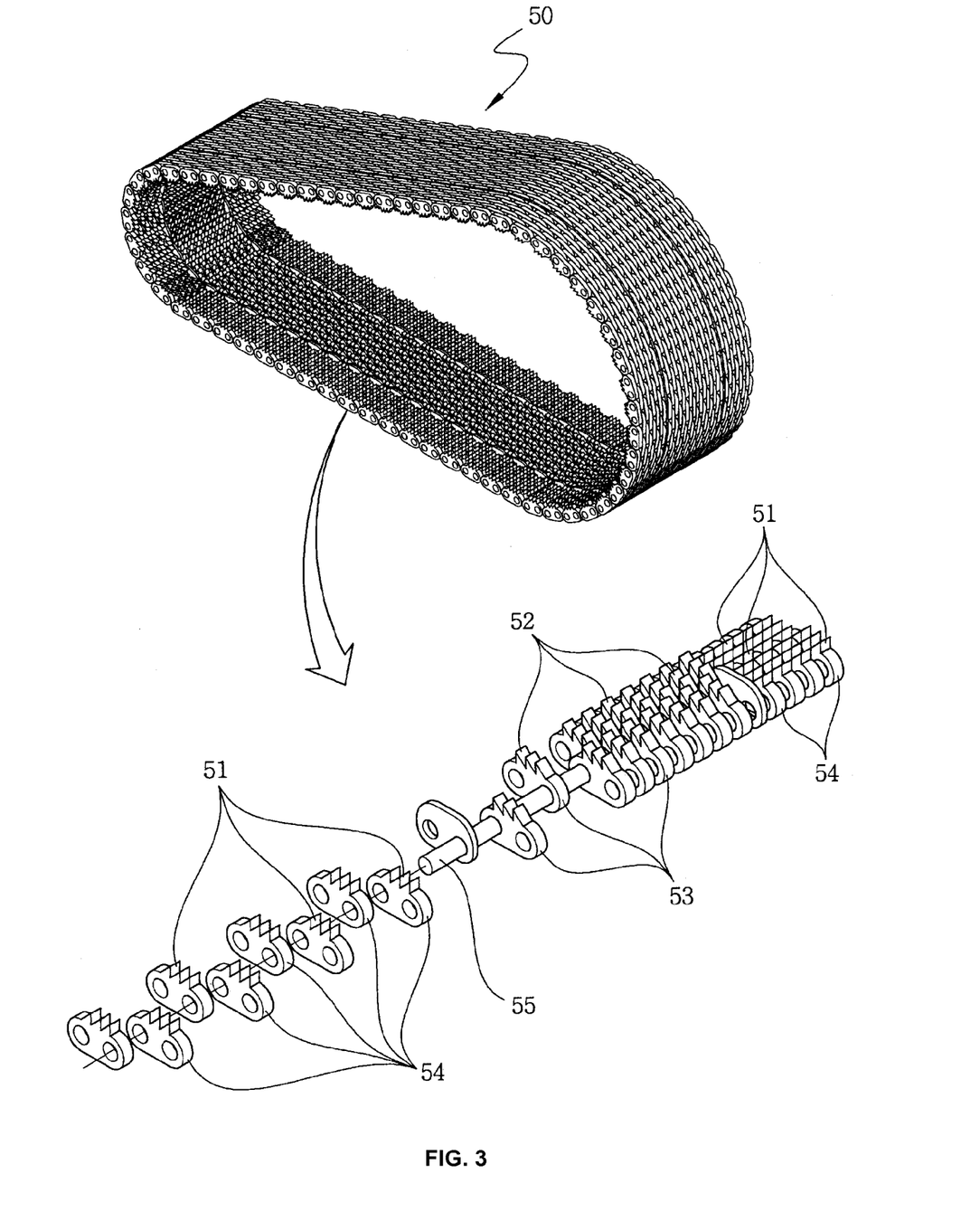
FIG. 3 is a perspective view illustrating a belt used in the belt-type CVT according to the present invention.
Figure 4:
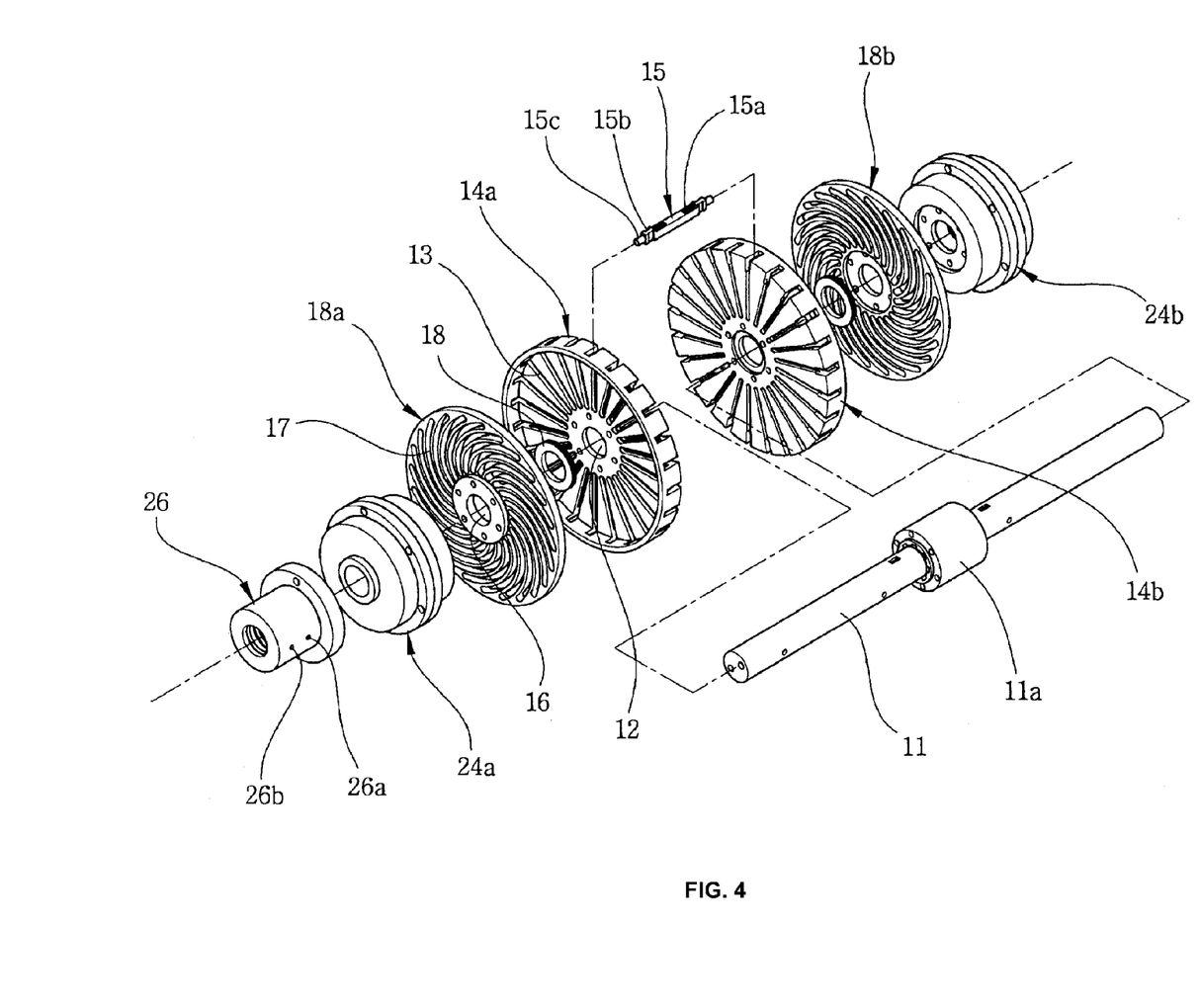
FIG. 4 is an exploded perspective view illustrating the construction of a variable drive pulley and a variable driven pulley used in the belt-type CVT according to the present invention.
Figure 5:
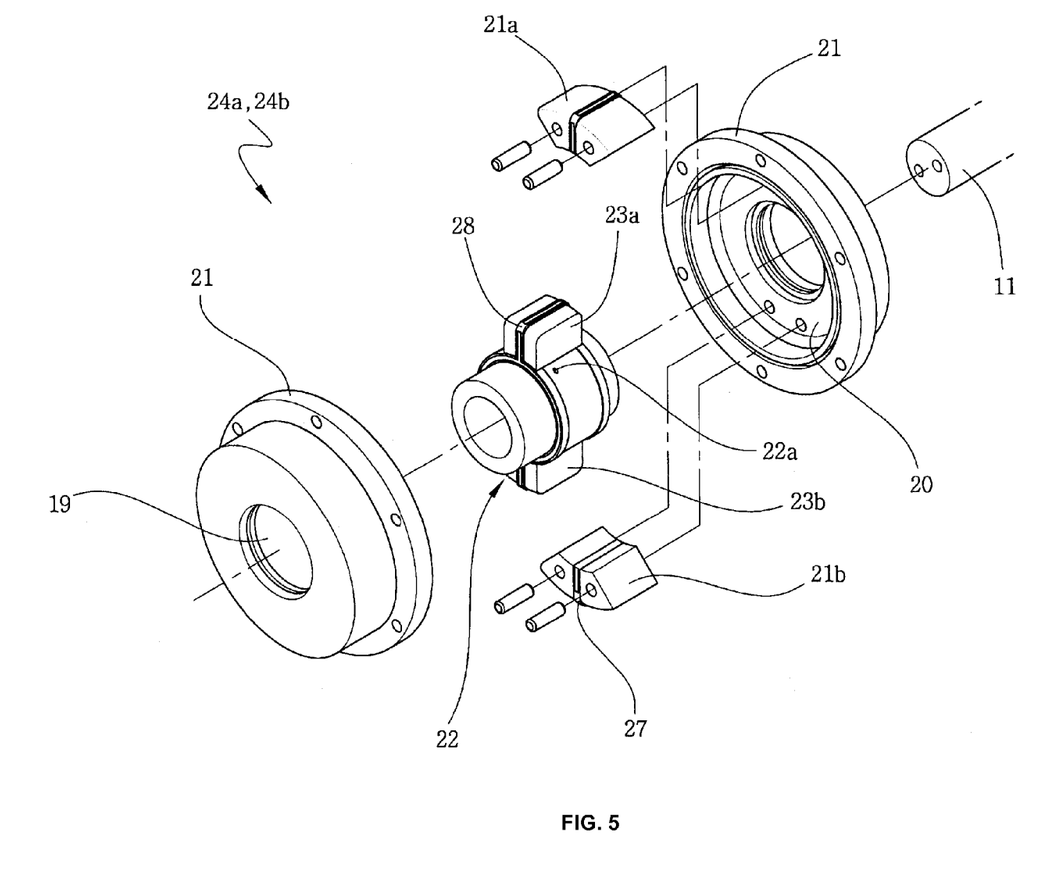
FIG. 5 is an exploded perspective view illustrating the construction of a hydraulic actuator used in the variable drive pulley and in the variable driven pulley of the belt-type CVT according to the present invention.
Figure 6:
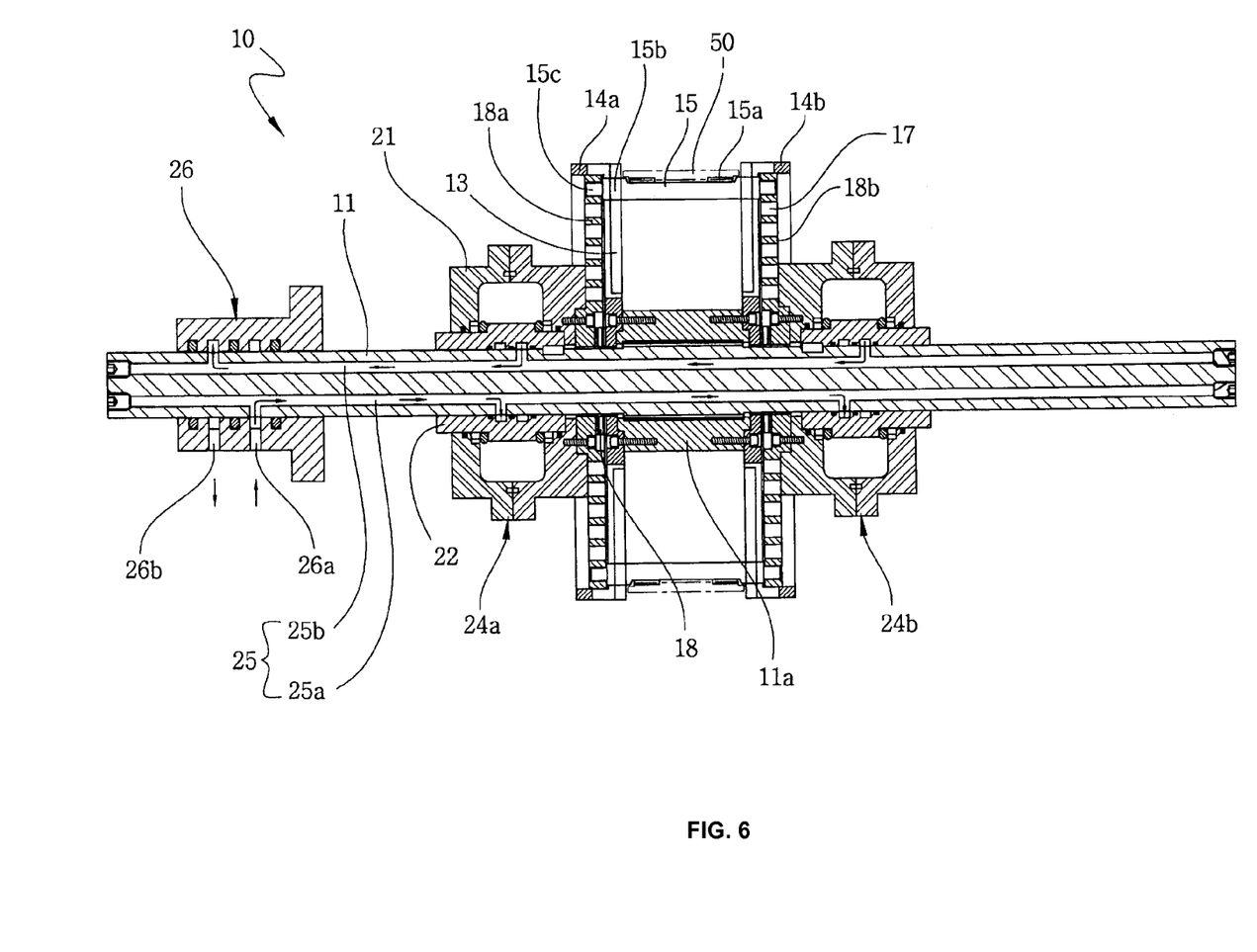
FIG. 6 is a sectional view illustrating both an assembled state of the variable drive pulley and the variable driven pulley of the belt-type CVT according to the present invention and a hydraulic pressure supply line provided in the pulleys.

FIG. 2 is a perspective view illustrating a belt-type CVT according to the present invention. FIG. 3 is a perspective view illustrating a belt used in the belt-type CVT according to the present invention. FIG. 4 is an exploded perspective view illustrating the construction of a variable drive pulley and a variable driven pulley used in the belt-type CVT according to the present invention. FIG. 5 is an exploded perspective view illustrating the construction of a hydraulic actuator used in the variable drive pulley and in the variable driven pulley of the belt-type CVT according to the present invention. FIG. 6 is a sectional view illustrating both an assembled state of the variable drive pulley and the variable driven pulley of the belt-type CVT according to the present invention and a hydraulic pressure supply line provided in the pulleys. FIGS. 7 and 8 are views illustrating the operating process of the belt-type CVT according to the present invention.

As shown in FIG. 2, the belt-type CVT according to the present invention includes a variable drive pulley 10, which controls the transmission gear ratio by varying the diameter thereof, and a variable driven pulley 30 which is connected to the variable drive pulley 10 by a belt 50 and controls the tension of the belt 50 by varying the diameter thereof in a manner opposite that of the variable drive pulley 10.

The variable drive pulley 10 and the variable driven pulley 30 have the same construction except for some elements so that the same elements both in the variable drive pulley 10 and in the variable driven pulley 30 will carry the same reference numerals and will be described in common and the different elements will carry different reference numerals and will be described separately.

As shown in FIG. 4, the variable drive pulley 10 includes a pulley shaft 11 that has a pulley plate holder 11a on the central portion of the outer circumferential surface thereof.

Here, although it is preferred that the pulley plate holder 11a provided on the central portion of the outer circumferential surface of the pulley shaft 11 be integrated with the pulley shaft 11 into a single body, the pulley plate holder 11a may be produced separately from the pulley shaft 11 prior to being assembled with the pulley shaft for ease of production.

Mounted to opposite ends of the pulley plate holder 11a of the pulley shaft 11 using locking units, such as locking bolts, are a pair of pulley plates 14a and 14b, with a pulley shaft hole 12 formed through the center of each of the pulley plates 14a and 14b and a plurality of slide slits 13 radially formed in each pulley plate at locations around the pulley shaft hole 12.

Further, a plurality of belt supports 15 are movably installed between the pulley plates 14a and 14b such that the belt supports can move relative to the pulley plates in radial directions. In each of the belt supports 15, a belt holding ratchet gear part 15a is provided on the outer surface of the belt support, a slide part 15b is provided on each end of the belt support and is inserted into an associated slide slit 13 of the pulley plates 14a and 14b, and a guide protrusion 15c axially extends from each end of the belt support and is projected outside the outer surface of an associated pulley plate 14a, 14b.

Here, the plurality of slide slits 13 formed in each of the pulley plates 14a and 14b may be configured to extend from the pulley shaft hole 12 in radial directions. However, it is preferred that the plurality of slide slits 13 be inclined relative to straight lines, which diametrically pass through the center of the pulley plate, at a predetermined angle of inclination. Here, the angle of inclination of the slide slits is preferably set to a value within a range of 0~90 degree angles according to the size, standard and usage of the CVT.

When the plurality of slide slits 13 are radially formed around the pulley shaft hole 12 in each of the pulley plates 14a and 14b in such a way that the slide slits are inclined at the predetermined angle of inclination relative to the straight lines passing through the center of the pulley plate as described above, and, at the same time, when the belt holding ratchet gear parts 15a formed on the outer surfaces of the belt supports 15 are configured to be inclined at the same angle of inclination as that of the slide slits, the plurality of belt supports 15 inserted at opposite ends thereof into the parallely facing slide slits 13 of the pulley plates are moved in radial directions and are brought into contact with the belt 50 in a state in which the belt supports are inclined at the predetermined angle of inclination relative to the central axis of the pulley shaft 11. Therefore, the belt holding ratchet gear parts 15a formed on the outer surface of each of the plurality of belt supports 15 are not simultaneously brought into contact with the belt 50, but are sequentially brought into contact with the belt 50 from one end of the belt holding ratchet gear parts 15a. Accordingly, during a process of transmitting power with variable pulley diameters, the present invention can reduce the impact and noise generated by the contact of the plurality of the belt supports 15 with the belt 50 and can realize reliable power transmission that occurs with changes of speed and torque even in the case of high speed rotation.

Further, it is preferred that the number of belt supports 15 be set to a maximum number determined by evenly dividing a circle corresponding to a minimum diameter of the pulleys according to design conditions in such a way that the belt 50 can efficiently rotate in a state in which the belt is being stably held by the pulleys. However, when the size of the belt holding ratchet gear parts 15a formed on the outer surfaces of the belt supports 15 is taken into consideration and when the strength, machining and assembling work efficiency both of the slide parts 15b and of the guide protrusions 15c provided on opposite ends of the belt support is also taken into consideration, the number of belt supports 15 is preferably set to about twenty four.

To the outer surfaces of the respective pulley plates 14a and 14b mounted to the opposite ends of the pulley plate holder 11a of the pulley shaft 11, a pair of the transmission plates 18a and 18b are rotatably mounted with a thrust bearing 18 interposed between each transmission plate and an associated pulley plate. Here, a pulley shaft hole 16 is formed through the center of each of the transmission plates 18a and 18b, and a plurality of involute slits 17 are formed in each of the transmission plates 18a and 18b in radial directions at locations around the pulley shaft hole 16 such that the guide protrusions 15c of the plurality of belt supports 15 movably installed between the pulley plates 14a and 14b by being inserted thereinto can be received by the respective involute slits.

Here, when the plurality of slits 17 formed in the transmission plates 18a and 18b to guide the guide protrusions 15c of the respective belt supports 15 are formed in the shape of the involute curves, the force required to realize the power transmission, that is the rotating force of the transmission plates 18a and 18b required to radially move the plurality of belt supports 15 installed between the pulley plates 14a and 14b, can be evenly applied to the plurality of belt supports 15 within a range from a maximum diameter portion to a minimum diameter portion of the pulleys, so that the desired power transmission that occurs with changes of speed and torque can be realized by the same rotating force for any range of the diameters.

Further, the transmission plates 18a and 18b rotatably mounted to the outer surfaces of the respective pulley plates 14a and 14b can be rotated in opposite directions by a transmission plate rotating device and radially move the plurality of belt supports 15 installed between the pulley plates 14a and 14b.

As shown in FIG. 6, the transmission plate rotating device for rotating the transmission plates 18a and 18b in opposite directions includes a pair of hydraulic actuators 24a and 24b mounted to the centers of the outer surfaces of the respective transmission plates 18a and 18b, an oil passage 25 formed in the pulley shaft 11 and supplying oil pressure to the hydraulic actuators 24a and 24b, and an oil inlet/outlet block 26 rotatably fitted over an end of the outer circumferential surface of the pulley shaft 11 such that the oil inlet/outlet block 26 can communicate with the oil passage 25 formed in the pulley shaft 11.

The hydraulic actuators 24a and 24b that constitute the transmission plate rotating device are mounted to the centers of the outer surfaces of the respective transmission plates 18a and 18b. As shown in FIG. 5, each of the hydraulic actuators 24a and 24b includes a housing 21 having a through hole 19 formed through each of front and rear walls thereof so that the pulley shaft 11 can pass through the housing 21, with an oil chamber 20 defined in the housing. Partitions 21a and 21b are oppositely installed in the housing 21 in such a way that the partitions can partition the oil chamber 20 into two spaces. Further, a rotor 22 is fitted over the outer circumferential surface of the pulley shaft 11 passing through the housing 21 at a location inside the oil chamber 20 partitioned by the partitions 21a and 21b into the two spaces, so that the rotor 22 can rotate along with the pulley shaft 11. Vanes 23a and 23b oppositely protrude from the outer circumferential surface of the rotor 22 in such a way that the vanes can divide the oil chamber 20 partitioned into the two spaces by the partitions 21a and 21b into four spaces.

Here, the partitions 21a and 21b and the rotor 22 installed in the housing 21 are provided with respective oil seals 27 and 28 for sealing the four spaces partitioned both by the partitions 21a and 21b and by the vanes 23a and 23b of the rotor 22.

Further, a plurality of oil inlet/outlet holes 22a and 22b are formed through the outer circumferential surface of the rotor 22. The oil inlet/outlet holes 22a and 22b communicate with the oil passage 25 inside the pulley shaft 11 by an oil groove formed in the inner circumferential surface of the rotor 22.

The oil passage 25 functions to reliably supply oil pressure to the hydraulic actuators 24a and 24b rotated along with the pulley shaft 11. The oil passage 25 is formed inside the pulley shaft 11 in such a way that the oil passage 25 can communicate with the plurality of oil inlet/outlet holes 22a and 22b formed through the rotors 22 installed inside the housings 21 of the hydraulic actuators 24a and 24b mounted to the transmission plates 18a and 18b.

The oil inlet/outlet block 26 functions to connect an oil pressure supply device to the oil passage 25 formed in the pulley shaft 11 that rotates at a predetermined speed. The oil inlet/outlet block 26 is rotatably fitted over the end of the outer circumferential surface of the pulley shaft 11 in such a way that the oil inlet/outlet block 26 can communicate with the oil passage 25 formed in the pulley shaft 11.

Here, a pair of oil inlet/outlet holes 26a and 26b are formed through an end of the outer circumferential surface of the oil inlet/outlet block 26. The oil inlet/outlet holes 26a and 26b communicate with the oil passage 25 inside the pulley shaft 11 by an oil groove formed in the inner circumferential surface of the oil inlet/outlet block 26.

Further, as shown in FIG. 6, in the oil pressure supply line for supplying oil pressure to the transmission plate rotating device, the inlet oil under pressure, supplied through the oil inlet/outlet holes 26a of the oil inlet/outlet block 26 rotatably fitted over the end of the outer circumferential surface of the pulley shaft 11, may pass through a first oil passage 25a formed in the pulley shaft 11 and then flows into both the hydraulic actuator 24a and the hydraulic actuator 24b, and is, thereafter, returned to the oil pressure supply device sequentially through a second oil passage 25b formed in the pulley shaft 11 and through the oil inlet/outlet holes 26b of the oil inlet/outlet block 26. Alternatively, the inlet oil under pressure, supplied through the oil inlet/outlet holes 26a of the oil inlet/outlet block 26, may pass through the second oil passage 25b formed in the pulley shaft 11 and then flow into both the hydraulic actuator 24b and the hydraulic actuator 24a, and is, thereafter, returned to the oil pressure supply device sequentially through the first oil passage 25a formed in the pulley shaft 11 and through the oil inlet/outlet holes 26b of the oil inlet/outlet block 26.

The variable driven pulley 30 has the same construction as that of the variable drive pulley 10, however, as shown in FIG. 2, the belt holding ratchet gear parts 31a formed on the outer surfaces of the belt supports 31 provided in the variable driven pulley 30 are inclined in a direction opposed to the direction of inclination of the belt holding ratchet gear parts 15a formed on the belt supports 15 provided in the variable driven pulley 10.

Here, it is preferred that the belt holding ratchet gear parts 15a formed on the outer surfaces of the belt supports 15 provided in the variable drive pulley 10 and the belt holding ratchet gear parts 31a formed on the outer surfaces of the belt supports 31 provided in the variable driven pulley 30 be arranged along offset lines without being arranged along the same lines in an effort to reduce transmission shock and to realize a stable and balanced belt holding state.

In other words, as shown in FIG. 2, when the belt holding ratchet gear parts 15a of the variable drive pulley 10 are formed on opposite ends of the outer surface of each belt support 15, the belt holding ratchet gear parts 31a of the variable driven pulley 30 are formed on the center of the outer surface of each belt support 31. On the contrary, when the belt holding ratchet gear parts 15a of the variable drive pulley 10 are formed on the center of the outer surface of each belt support 15, the belt holding ratchet gear parts 31a of the variable driven pulley 30 are formed on the opposite ends of the outer surface of each belt support 31.

Further, the belt 50 is provided on the inner surface thereof with both drive-side ratchet gear parts 51 engaged with the belt holding ratchet gear parts 15a formed on the belt supports 15 of the variable drive pulley 10 and driven-side ratchet gear parts 52 engaged with the belt holding ratchet gear parts 31a formed on the belt supports 31 of the variable driven pulley 30, wherein the drive-side ratchet gear parts 51 and driven-side ratchet gear parts 52 are alternately arranged.

Here, the belt 50 may be constructed in the form of a flat belt or a link belt. When the belt 50 is constructed in the form of a flat belt, it is preferred that the belt be made of the same materials as those of conventional belts or be made of metal, synthetic resin or carbon fiber in an effort to increase the durability of the belt.

Further, when the belt 50 is constructed in the form of a link belt, as shown in FIG. 3, it is preferred that a plurality of link plates 53 having the drive-side ratchet gear parts 51 engaged with the belt holding ratchet gear parts 15a formed on the belt supports 15 of the variable drive pulley 10 and a plurality of link plates 54 having the driven-side ratchet gear parts 52 engaged with the belt holding ratchet gear parts 31a formed on the belt supports 31 of the variable driven pulley 30 be coupled to each other using a link pin 55.

Further, it is preferred that both the drive-side ratchet gear parts 51 and the driven-side ratchet gear parts 52 provided on the inner surface of the belt 50 be arranged at respective locations corresponding to the locations of the belt holding ratchet gear parts 15a of the variable drive pulley 10 and to the locations of the belt holding ratchet gear parts 31a of the variable driven pulley 30.

Described in detail, as shown in FIG. 2 and FIG. 3, when the belt holding ratchet gear parts 15a of the variable drive pulley 10 are formed on the opposite ends of the outer surfaces of the belt supports 15 and the belt holding ratchet gear parts 31a of the variable driven pulley 30 are formed on the centers of the outer surfaces of the belt supports 31, the drive-side ratchet gear parts 51 and the driven-side ratchet gear parts 52 provided on the inner surface of the belt 50 are formed along the opposite ends and along the center of the inner surface of the belt 50, respectively. On the contrary, when the belt holding ratchet gear parts 15a of the variable drive pulley 10 are formed on the centers of the outer surfaces of the belt supports 15 and the belt holding ratchet gear parts 31a of the variable driven pulley 30 are formed on the opposite ends of the outer surfaces of the belt supports 31, the drive-side ratchet gear parts 51 and the driven-side ratchet gear parts 52 provided on the inner surface of the belt 50 are formed along the center and along the opposite ends of the inner surface of the belt 50, respectively.

The operation of the above-mentioned belt-type CVT according to the present invention will be described hereinbelow.

In the belt-type CVT according to the present invention, an oil pressure supply device, which is not shown in the drawings, is connected to the oil inlet/outlet blocks 26 of respective transmission plate rotating devices provided in the variable drive pulley 10 and in the variable driven pulley 30 and the hydraulic actuators 24a and 24b are operated, so that the diameters of respective pulleys can be easily and efficiently varied.

Figure 7A:
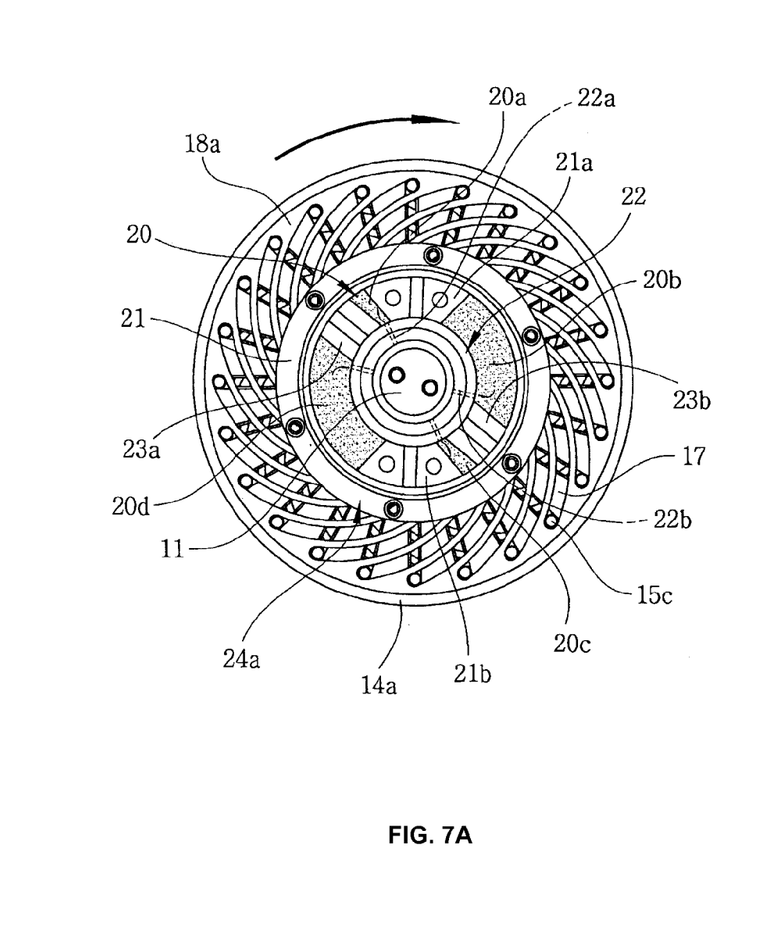
FIGS. 7 and 8 are views illustrating the operating process of the belt-type CVT according to the present invention.
Figure 7B:
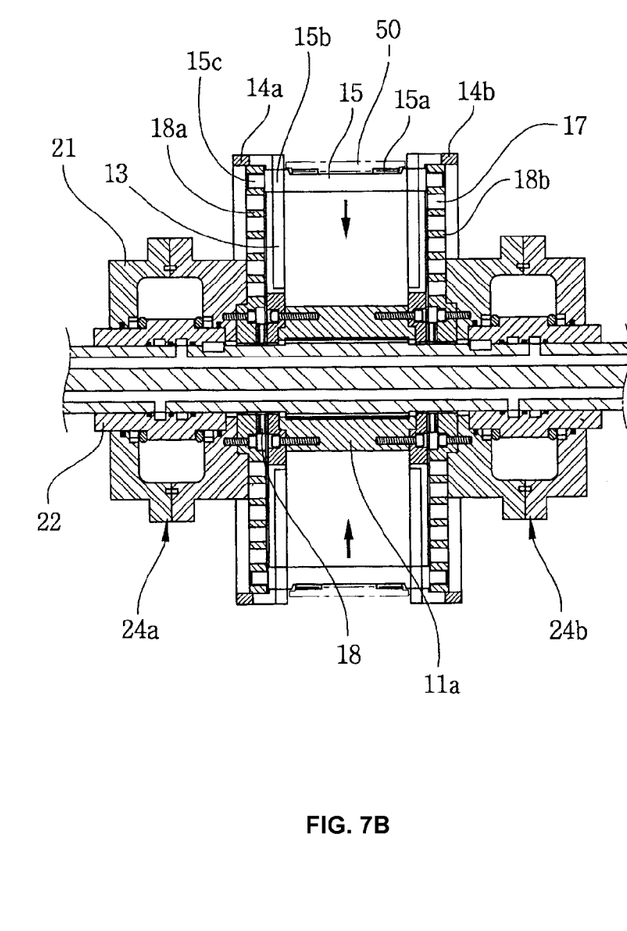

That is, as shown in FIGS. 7(a) and 7(b), to reduce the diameter of the variable drive pulley 10 which has stayed at the maximum diameter, oil under pressure is supplied to the hydraulic actuators 24a and 24b mounted to the centers of the outer surfaces of the respective transmission plates 18a and 18b sequentially through the oil inlet/outlet holes 26a formed in the oil inlet/outlet block 26 rotatably fitted over the end of the outer circumferential surface of the pulley shaft 11 and through the first oil passage 25a formed in the pulley shaft 11.

Here, as shown in FIG. 7(a), the oil under pressure that has been supplied to the hydraulic actuator 24a mounted to the center of the outer surface of the transmission plate 18a flows both into the first space 20a and into the third space 20c of the oil chamber 20 defined inside the housing 21 through the plurality of oil inlet/outlet holes 22a formed through the rotor 22, thereby applying oil pressure to the partitions 21a and 21b installed in the housing 21. The oil under pressure that has been supplied both into the first space 20a and into the third space 20c of the oil chamber 20 applies oil pressure to the partitions 21a and 21b installed in the housing 21. Therefore, the oil that has been stored both in the second space 20b and in the fourth space 20d of the oil chamber 20 is discharged therefrom through the oil inlet/outlet holes 22b of the rotor 22, so that the housing 21 is rotated and, accordingly, the transmission plate 18a mounted to the housing 21 is rotated clockwise by the rotation of the housing 21.

Further, the oil under pressure, supplied to the hydraulic actuator 24b mounted to the center of the outer surface of the transmission plate 18b, actuates the hydraulic actuator 24b, so that the transmission plate 18b mounted to the hydraulic actuator 24b is rotated counterclockwise.

Here, the rotors 22 installed in the housings 21 of the respective hydraulic actuators 24a and 24b are arranged to form a cross-shaped profile, that is, the rotor 22 of the hydraulic actuator 24a is arranged in such a way that the vanes 23a and 23b thereof are directed at 5 o'clock and at 11 o'clock, respectively, and the rotor 22 of the hydraulic actuator 24b is arranged in such a way that the vanes 23a and 23b are directed at 1 o'clock and at 7 o'clock, respectively, so that every time oil pressure is applied to the hydraulic actuators 24a and 24b, the transmission plates 18a and 18b are rotated in opposite directions.

When the transmission plates 18a and 18b are rotated in opposite directions by the respective hydraulic actuators 24a and 24b as described above, the rotating force of the transmission plates is applied to the guide protrusions 15c of the belt supports 15 movably inserted into the involute slits 17 of the transmission plates 18a and 18b. Here, when the rotating force of the transmission plates 18a and 18b is applied to the guide protrusions 15c formed on the opposite ends of the belt supports 15, the slide parts 15b of the respective belt supports 15 move inwardly along the respective slide slits 13 of the pulley plates 14a and 14b in radial directions, so that the diameter of the variable drive pulley 10 formed by the plurality of belt supports 15 can be easily and efficiently reduced.

Figure 8A:
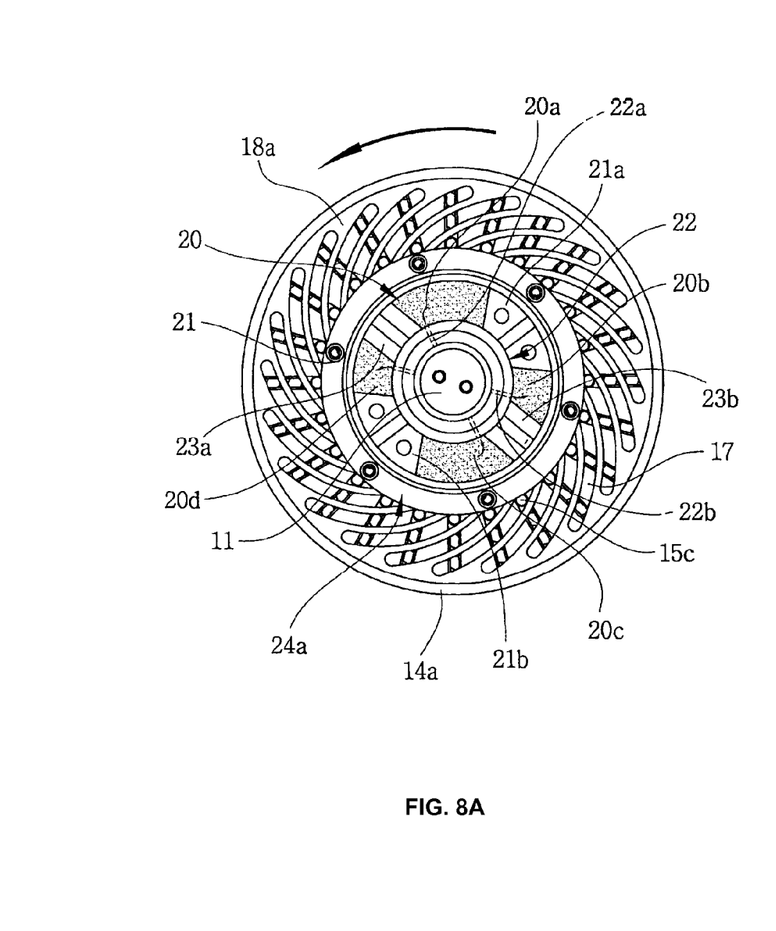
Figure 8B:
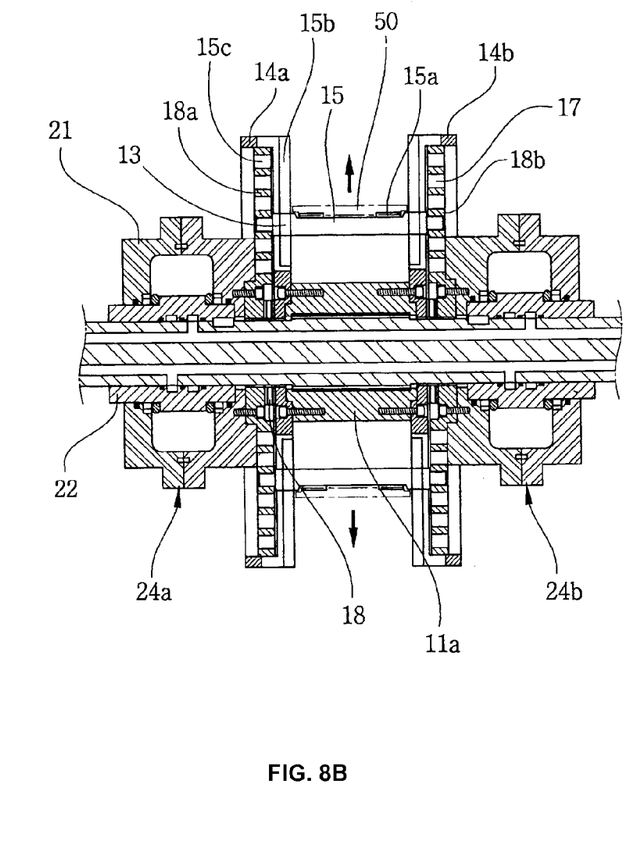

On the other hand, to increase the reduced diameter of the variable drive pulley 10, as shown in FIGS. 8(a) and 8(b), oil under pressure is supplied to the hydraulic actuators 24a and 24b mounted to the centers of the outer surfaces of the respective transmission plates 18a and 18b through the oil inlet/outlet holes 26b formed in the oil inlet/outlet block 26 rotatably fitted over the end of the outer circumferential surface of the pulley shaft 11 and through the second oil passage 25b formed in the pulley shaft 11.

The oil under pressure, supplied to the hydraulic actuators 24a and 24b mounted to the centers of the outer surfaces of the respective transmission plates 18a and 18b, flows both into the second space 20b and into the fourth space 20d of the oil chamber 20 defined in the housing 21 through the plurality of oil inlet/outlet holes 22b of the rotor 22 and applies pressure to the partitions 21a and 21b installed in the housing 21. Because the oil supplied into both the second space 20b and the fourth space 20d of the oil chamber 20 applies pressure to the partitions 21a and 21b installed in the housing 21 as described above, oil which has been stored in both the first space 20a and the third space 20c of the oil chamber 20 is discharged therefrom through the oil inlet/outlet holes 22a of the rotor 22 and rotates the housing 21. Due to the above-mentioned rotation of the housing 21, the transmission plate 18a mounted to the housing 21 is rotated counterclockwise.

Further, in the above state, oil under pressure supplied to the hydraulic actuator 24b mounted to the center of the outer surface of the transmission plate 18b actuates the hydraulic actuator 24b, so that the transmission plate 18b mounted to the hydraulic actuator 24b is rotated clockwise.

When the transmission plates 18a and 18b are rotated in opposite directions by the respective hydraulic actuators 24a and 24b, as described above, the rotating force of the transmission plates 18a and 18b is applied to the guide protrusions 15c of the belt supports 15 movably inserted into the respective involute slits 17 of the transmission plates 18a and 18b. When the rotating force of the transmission plates 18a and 18b is applied to the guide protrusions 15c provided on the opposite ends of the belt supports 15, the slide parts 15b of the respective belt supports 15 outwardly move along the slide slits 13 of the pulley plates 14a and 14b in radial directions, so that the diameter of the variable drive pulley 10 formed by the plurality of belt supports 15 can be easily and efficiently increased.

In the variable driven pulley 30, the orientation of the vanes of the respective rotors 22 installed in the hydraulic actuators 24a and 24b is opposed to that of the vanes of the rotors in the variable drive pulley 10, so that when oil pressure is applied to the hydraulic actuators 24a and 24b, the transmission plates 18a and 18b are rotated in directions opposite to those of the transmission plates in the variable drive pulley 10. Therefore, the diameter of the variable driven pulley 30 varies in a manner opposed that of the variable drive pulley 10 in such a way that, when the diameter of the variable drive pulley 10 is being increased, the diameter of the variable driven pulley 30 is being reduced, however, when the diameter of the variable drive pulley 10 is being reduced, the diameter of the variable driven pulley 30 is being increased.

As described above, the diameter of the variable driven pulley 30 can vary in a manner opposed to that of the variable drive pulley 10, so that the tension of the belt 50 wrapped around both the variable drive pulley 10 and the variable driven pulley 30 can be efficiently controlled.

Therefore, in the belt-type CVT according to the present invention, the diameters of both the variable drive pulley 10 and the variable driven pulley 30 can easily and efficiently vary, so that the belt-type CVT can realize more precise and efficient stepless variable transmission.

Further, in the belt-type CVT according to the present invention, the belt 50 an be rotated in a state in which the drive-side ratchet gear parts 51 formed along an axis on the inner surface of the belt 50 are reliably engaged with the belt holding ratchet gear parts 15a formed on the outer surfaces of the plurality of belt supports 15 in the variable drive pulley 10 and, at the same time, the driven-side ratchet gear parts 52 formed along another axis on the inner surface of the belt 50 are reliably engaged with the belt holding ratchet gear parts 31a formed on the outer surfaces of the plurality of belt supports 31 in the variable driven pulley 30, so that even when an excessive load is imposed on the belt and pulleys, the belt can be prevented from slipping over the pulleys.

Further, in the belt-type CVT according to the present invention, both the variable drive pulley 10 and the variable driven pulley 30 can be configured to have large widths, respectively, and, at the same time, the size and capacity of the belt-type CVT can be easily controlled by easily changing the locations of the belt holding ratchet gear parts 15a and 31a formed on the outer surfaces of the belt supports 15 and 31 and by easily increasing the number of belts 50 wrapped around the variable drive pulley 10 and the variable driven pulley 30. Therefore, the belt-type CVT of the present invention can be efficiently used in a variety of machines, such as automobiles, ships, hoists, conveyors for goods transfer, winches, elevators and escalators, used in a variety of industrial fields.

The invention claimed is:

1. A belt-type continuously variable transmission, comprising:
a variable drive pulley controlling a transmission gear ratio by varying a diameter thereof, and a variable driven pulley connected to the variable drive pulley by a belt and controlling a tension of the belt by varying a diameter thereof in a manner opposite that of the variable drive pulley,
wherein the variable drive pulley comprises:
a pulley shaft having a pulley plate holder on a central portion of an outer circumferential surface thereof;
a pair of pulley plates respectively mounted to opposite ends of the pulley plate holder of the pulley shaft, each of the pair of pulley plates having a pulley shaft hole formed through a center thereof and a plurality of slide slits radially formed therein at locations outside the pulley shaft hole;
a plurality of belt supports movably installed between the pair of pulley plates such that the plurality of belt supports can move relative to the pair of pulley plates in radial directions, each of the plurality of belt supports having a belt holding ratchet gear part formed on an outer surface thereof, a slide part formed on each end thereof and inserted into an associated slide slit of the plurality of slide slits of the pair of pulley plates, and a guide protrusion protruding outside an outer surface of an associated one of the pair of pulley plates;
a pair of transmission plates rotatably mounted to the outer surfaces of the respective pair of pulley plates mounted to the opposite ends of the pulley plate holder of the pulley shaft, with a pair of thrust bearings interposed between each of the transmission plates and the associated pulley plate of the pair of pulley plates respectively, each of the transmission plates having a pulley shaft hole formed through a center thereof and a plurality of involute slits radially formed therein at locations outside the pulley shaft hole such that the plurality of involute slits of the transmission plates receive respective guide protrusions of the plurality of belt supports installed between the pair of pulley plates; and
a transmission plate rotating device for rotating the transmission plates rotatably mounted to the outer surfaces of the respective pulley plates in opposite directions, thereby moving the plurality of belt supports installed between the pair of pulley plates in radial directions,
wherein the variable driven pulley has the same construction as that of the variable drive pulley, wherein belt holding ratchet gear parts formed on outer surfaces of belt supports of the variable driven pulley are inclined in a direction opposed to that of the belt holding ratchet gear parts formed on the plurality of belt supports of the variable drive pulley, and wherein the belt includes: a left side belt portion, a center belt portion and a right side belt portion, all extending longitudely throughout the belt, wherein each of the left side belt portion and right side belt portions includes a plurality of drive-side ratchet gear parts disposed on an inner surface thereof and engaged with a left and a right portions of each of the belt holding ratchet gear parts disposed on the plurality of belt supports of the variable drive pulley, and wherein the center belt portion includes a plurality of driven-side ratchet gear parts inclined in a direction opposed to that of the plurality of the plurality of drive-side ratchet gear parts and engaged with a center portion of each of the belt holding ratchet gear parts disposed on the belt supports of the variable driven pulley.

2. The belt-type continuously variable transmission as set forth in claim 1, wherein the transmission plate rotating device comprises:

a pair of hydraulic actuators mounted to central portions of outer surfaces of respective transmission plates, each of the hydraulic actuators comprising:

a housing having a through hole formed through each of front and rear walls thereof so that the pulley shaft passes through the housing, with an oil chamber defined in the housing;

partitions oppositely installed in the housing in such a way that the partitions are configured to partition the oil chamber into two spaces;

a rotor fitted over an outer circumferential surface of the pulley shaft which passes through the housing at a location inside the oil chamber partitioned by the partitions into the two spaces, so that the rotor rotates along with the pulley shaft;

vanes oppositely protruding from an outer circumferential surface of the rotor in such a way that the vanes divide the oil chamber partitioned into the two spaces by the partitions into four spaces;

an oil passage formed in the pulley shaft such that the oil passage communicates with a plurality of oil inlet/outlet holes formed in the rotor inserted into the housing of each of the pair of hydraulic actuators, and applies hydraulic pressure to each of the pair of hydraulic actuators mounted to the respective transmission plates; and an oil inlet/outlet block rotatably fitted over an end of the outer circumferential surface of the pulley shaft in such a way that the oil inlet/outlet block communicates with the oil passage formed in the pulley shaft.

3. A belt-type continuously variable transmission, comprising:

a variable drive pulley controlling a transmission gear ratio by varying a diameter thereof, and a variable driven pulley connected to the variable drive pulley by a belt and controlling a tension of the belt by varying a diameter thereof in a manner opposite that of the variable drive pulley, wherein the variable drive pulley comprises:

a pulley shaft having a pulley plate holder on a central portion of an outer circumferential surface thereof;

a pair of pulley plates respectively mounted to opposite ends of the pulley plate holder of the pulley shaft, each of the pair of pulley plates having a pulley shaft hole formed through a center thereof and a plurality of slide slits radially formed therein at locations outside the pulley shaft hole;

a plurality of belt supports movably installed between the pair of pulley plates such that the plurality of belt supports can move relative to the pair of pulley plates in radial directions, each of the plurality of belt supports having a belt holding ratchet gear part formed on an outer surface thereof, a slide part formed on each end thereof and inserted into an associated slide slit of the plurality of slide slits of the pair of pulley plates, and a guide protrusion protruding outside an outer surface of an associated one of the pair of pulley plates;

a pair of transmission plates rotatably mounted to the outer surfaces of the respective pair of pulley plates mounted to the opposite ends of the pulley plate holder of the pulley shaft, with a pair of thrust bearings interposed between each of the transmission plates and the associated pulley plate of the pair of pulley plates respectively, each of the transmission plates having a pulley shaft hole formed through a center thereof and a plurality of involute slits radially formed therein at locations outside the pulley shaft hole such that the plurality of involute slits of the transmission plates receive respective guide protrusions of the plurality of belt supports installed between the pair of pulley plates; and a transmission plate rotating device for rotating the transmission plates rotatably mounted to the outer surfaces of the respective pulley plates in opposite directions, thereby moving the plurality of belt supports installed between the pair of pulley plates in radial directions, wherein the variable driven pulley has the same construction as that of the variable drive pulley, wherein belt holding ratchet gear parts formed on outer surfaces of belt supports of the variable driven pulley are inclined in a direction opposed to that of the belt holding ratchet gear parts formed on the plurality of belt supports of the variable drive pulley, and wherein the belt includes: a left side belt portion, a center belt portion and a right side belt portion, all extending longitudely throughout the belt, wherein the center belt portion includes a plurality of drive-side ratchet gear parts disposed on an inner surface thereof and engaged with a center portion of each of the belt holding ratchet gear parts disposed on the plurality of belt supports of the variable drive pulley, and wherein each of the left side belt portion and right side belt portions includes a plurality of driven-side ratchet gear parts inclined in a direction opposed to that of the plurality of the plurality of drive-side ratchet gear parts and engaged with a left and right portions of each of the belt holding ratchet gear parts disposed on the belt supports of the variable driven pulley.

* * * * *